(12) United States Patent
Jung

(10) Patent No.: US 7,679,892 B2
(45) Date of Patent: Mar. 16, 2010

(54) SUPPORTING DEVICE FOR DISPLAY APPARATUS AND DISPLAY APPARATUS HAVING THE SAME

(75) Inventor: Jun Su Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 58 days.

(21) Appl. No.: 12/030,229

(22) Filed: Feb. 13, 2008

(65) Prior Publication Data

US 2009/0032664 A1    Feb. 5, 2009

(30) Foreign Application Priority Data

Aug. 1, 2007    (KR) ...................... 10-2007-0077397

(51) Int. Cl.
*G06F 1/16*    (2006.01)
(52) U.S. Cl. ................ 361/679.21; 248/310; 248/122.1
(58) Field of Classification Search ............ 361/679.21; 248/310, 122.1
See application file for complete search history.

(56) References Cited

U.S. PATENT DOCUMENTS 6,400,560 B1 *   6/2002   Chian ................... 361/679.27
7,099,148 B2 *   8/2006   Lee ..................... 361/679.21
2004/0011932 A1 *   1/2004   Duff .......................... 248/157
2008/0035802 A1 *   2/2008   Kim ....................... 248/123.11

FOREIGN PATENT DOCUMENTS

KR    10-0672566 B1    1/2007

* cited by examiner

*Primary Examiner*—Lisa Lea-Edmonds
(74) *Attorney, Agent, or Firm*—Sughrue Mion, PLLC

(57) ABSTRACT

A supporting device for a display apparatus having a simplified configuration and an ease in manufacture with reduced manufacturing costs, and a display apparatus having the same. The supporting device includes a first supporting member coupled to a body of the display apparatus and defining therein a bore having an opened bottom, a second supporting member having a connecting portion to be inserted into the bore, an outer surface of the connecting portion being configured to correspond to the bore, a base to support the second supporting member, a connecting shaft to rotatably connect the first supporting member with the connecting portion and having both ends fixed to the first supporting member, and a friction structure provided between an outer surface of the connecting shaft and the connecting portion.

20 Claims, 5 Drawing Sheets

SUPPORTING DEVICE FOR DISPLAY APPARATUS AND DISPLAY APPARATUS HAVING THE SAME

CROSS-REFERENCE TO RELATED APPLICATION

This application claims the benefit of Korean Patent Application No. 2007-0077397, filed on Aug. 1, 2007 in the Korean Intellectual Property Office, the disclosure of which is incorporated herein by reference.

BACKGROUND OF THE INVENTION

1. Field of the Invention

The present invention relates to a supporting device for a display apparatus, and, more particularly, to a supporting device for a display apparatus, which has a simplified configuration and an ease in manufacture, and a display apparatus having the same.

2. Description of the Related Art

A display apparatus, such as an LCD or PDP, includes a supporting device to support a body of the display apparatus such that the display apparatus can be used on a desk or table. Conventionally, the supporting device for the display apparatus has the function of adjusting the screen angle of the body, etc.

Korean Patent Laid-Open Publication No. 2006-0074206 (published on Jul. 3, 2006) discloses an example of the supporting device. The conventional supporting device comprises a pivot bracket coupled to a rear surface of a monitor body, and a stand having an upper end rotatably connected to the pivot bracket by a monitor hinge unit and a lower end rotatably connected to a base by a base hinge unit. The conventional supporting device further comprises a link bar to keep the monitor body at a constant angle while the height of the monitor body is being adjusted. Together with the upper end of the stand, an upper end of the link bar is coupled to the pivot bracket by means of a hinge shaft of the monitor hinge unit. Also, together with the lower end of the stand, a lower end of the link bar is coupled to the base by a hinge shaft of the base hinge unit.

The above described supporting device for a display apparatus has a great number of elements including the stand, the link bar, the monitor hinge unit, the base hinge unit, etc., and consequently, suffers from a complicated configuration. Therefore, the conventional supporting device is difficult and expensive to manufacture.

SUMMARY OF THE INVENTION

The present invention has been made in order to solve the above problems. It is an aspect of the invention to provide a supporting device for a display apparatus, which has a more simplified configuration than the prior art, and can achieve an ease in manufacture and reduced manufacturing costs, and a display apparatus having the same.

Additional aspects and/or advantages of the invention will be set forth in part in the description which follows and, in part, will be obvious from the description, or may be learned by practice of the invention.

In accordance with an aspect of the invention, the above and/or other aspects can be achieved by the provision of a supporting device for a display apparatus comprising: a first supporting member coupled to a body of the display apparatus and defining therein a bore having an opened bottom; a second supporting member having a connecting portion to be inserted into the bore, an outer surface of the connecting portion being configured to correspond to the bore; a base to support the second supporting member; a connecting shaft to rotatably connect the first supporting member with the connecting portion and having both ends fixed to the first supporting member; and a friction structure provided between an outer surface of the connecting shaft and the connecting portion.

The connecting shaft may comprise first and second polygonal heads formed at both the ends thereof, and the first supporting member may comprise first and second polygonal coupling holes corresponding to the first and second polygonal heads to be coupled with the first and second polygonal heads, respectively.

The first polygonal head may be larger than the second polygonal head.

The supporting device may further comprise: a rotation-limit structure provided at an inner surface of the bore and the outer surface of the connecting portion, to allow the first supporting member to be rotated relative to the second supporting member only by a predetermined range.

The rotation-limit structure may comprise a rotation-limit protrusion protruding from the outer surface of the connecting portion and a rotation-limit recess formed in the inner surface of the bore, the rotation-limit protrusion being inserted into and rotated in the rotation-limit recess by a predetermined range.

The friction structure may comprise at least one of a friction ring coupled around the outer surface of the connecting shaft and a friction spring fixed in the connecting portion.

The connecting portion may comprise a shaft coupling bore for the penetration of the connecting shaft, and the friction spring may comprise a cylindrical tightening portion disposed in the shaft coupling bore to tighten the outer surface of the friction ring and a fixing portion extending from one end of the tightening portion and fixed to the connecting portion.

The connecting shaft may comprise a coupling groove formed in the outer surface thereof for the coupling of the friction ring.

The first supporting member may comprise a body connecting portion extending from an outer surface thereof so as to be coupled with the body, and the body connecting portion may comprise at least one protrusion to be elastically deformed when being coupled with the body.

The first supporting member, the second supporting member, and the connecting shaft may be made of resins.

In accordance with another aspect of the invention, the above and/or other aspects can be achieved by the provision of a display apparatus comprising a body having a screen and a supporting device to support the body, and the supporting device may comprise: a first supporting member coupled to a body of the display apparatus and defining therein a bore having an opened bottom; a second supporting member having a connecting portion to be inserted into the bore, an outer surface of the connecting portion being configured to correspond to the bore; a base to support the second supporting member; a connecting shaft to rotatably connect the first supporting member with the connecting portion and having both ends fixed to the first supporting member; and a friction structure provided between an outer surface of the connecting shaft and the connecting portion.

BRIEF DESCRIPTION OF THE DRAWINGS

These and/or other aspects and advantages of the exemplary embodiments of the invention will become apparent and more readily appreciated from the following description of the embodiments, taken in conjunction with the accompanying drawings, of which.

DETAILED DESCRIPTION OF THE PREFERRED EMBODIMENTS

Figure 1:
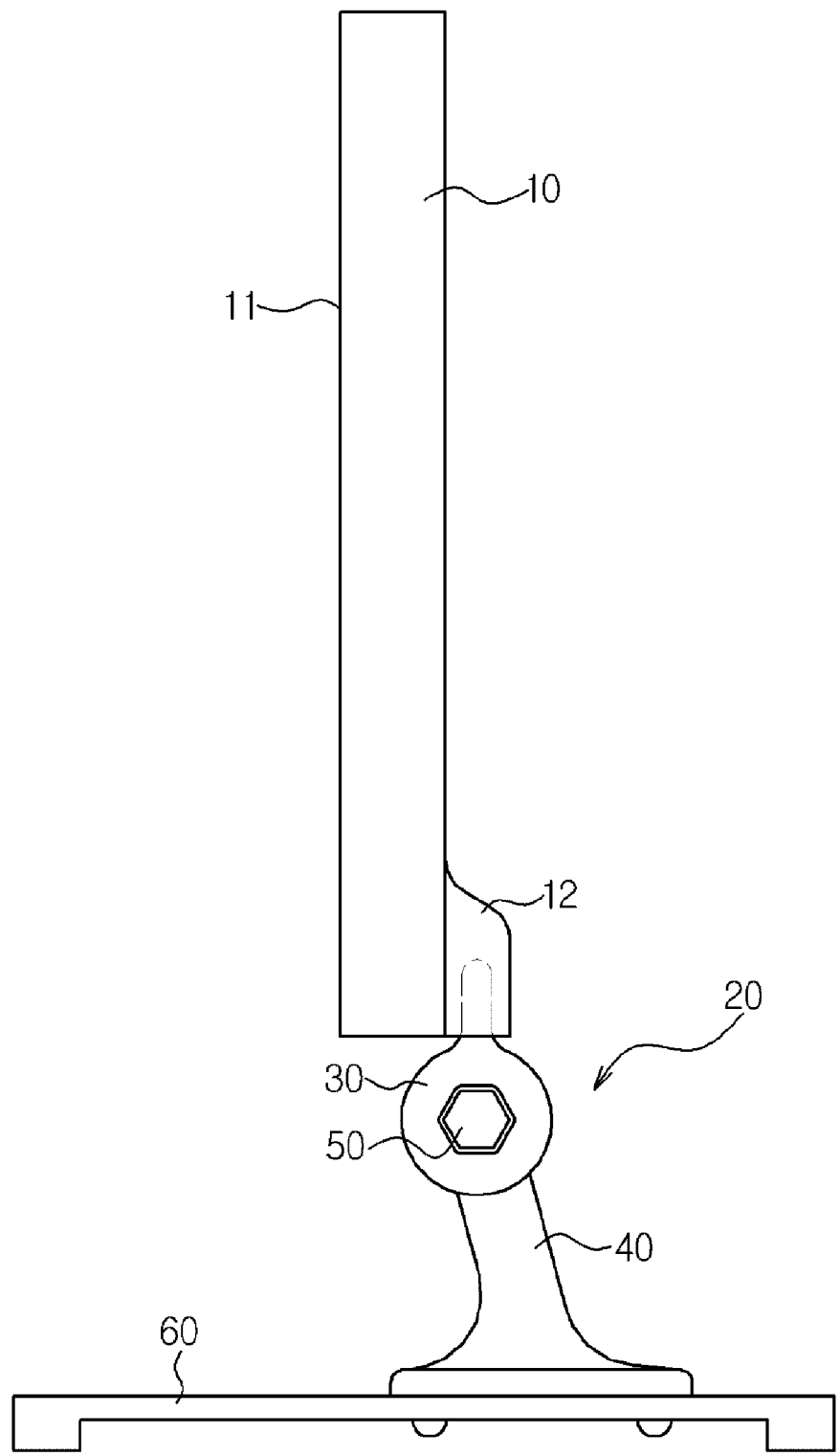
FIG. 1 is a side view of a display apparatus having a supporting device according to the present invention.

Reference will now be made in detail to exemplary embodiments of the present invention, examples of which are illustrated in the accompanying drawings, wherein like reference numerals refer to like elements throughout. The embodiments are described below to explain the present invention by referring to the figures.

FIG. 1 is a side view of a display apparatus having a supporting device according to the present invention. The display apparatus comprises a body 10 having a screen 11 provided at a front surface thereof to form an image, and a supporting device 20 to support the body 10. The body 10 may be a liquid crystal display panel (LCD) or plasma display panel (PDP).

The supporting device 20 includes a first supporting member 30 connected to a supporting bracket 12 attached to a rear surface of the body 10, a second supporting member 40 having an upper end rotatably connected to the first supporting member 30, a connecting shaft 50 to connect the first supporting member 30 and the second supporting member 40 to each other, and a flat-plate shaped base 60 coupled to a lower end of the second supporting member 40 and configured to be put on a desk or table. The base 60 supports the lower end of the second supporting member 40 such that the body 10 can be stably supported. The base 60 may be coupled to the second supporting member 40 after being previously fabricated, or may be integrally formed with the second supporting member 40.

Figure 2:
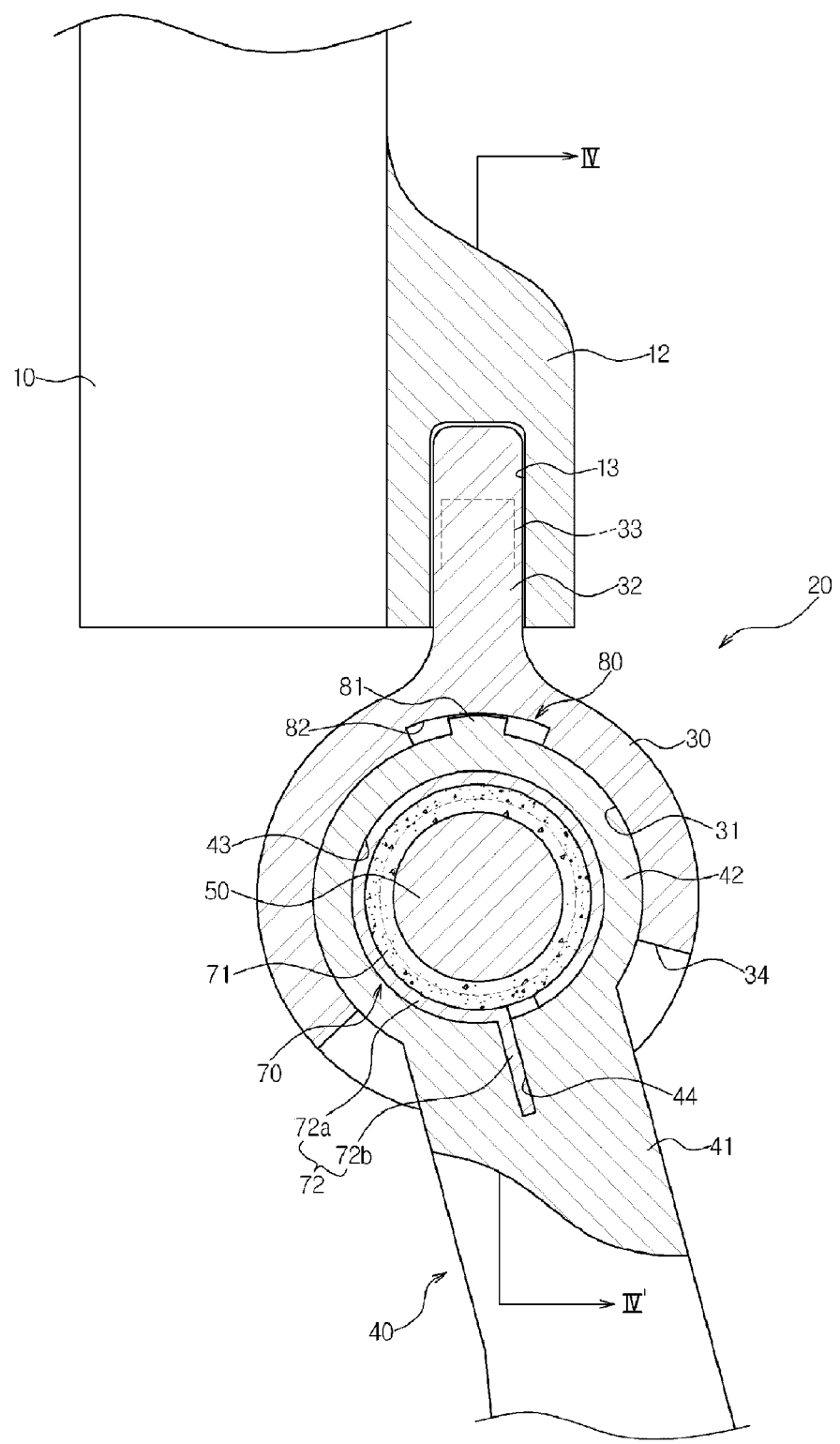
FIG. 2 is a sectional view illustrating important parts of the supporting device for the display apparatus according to the present invention.
Figure 3:
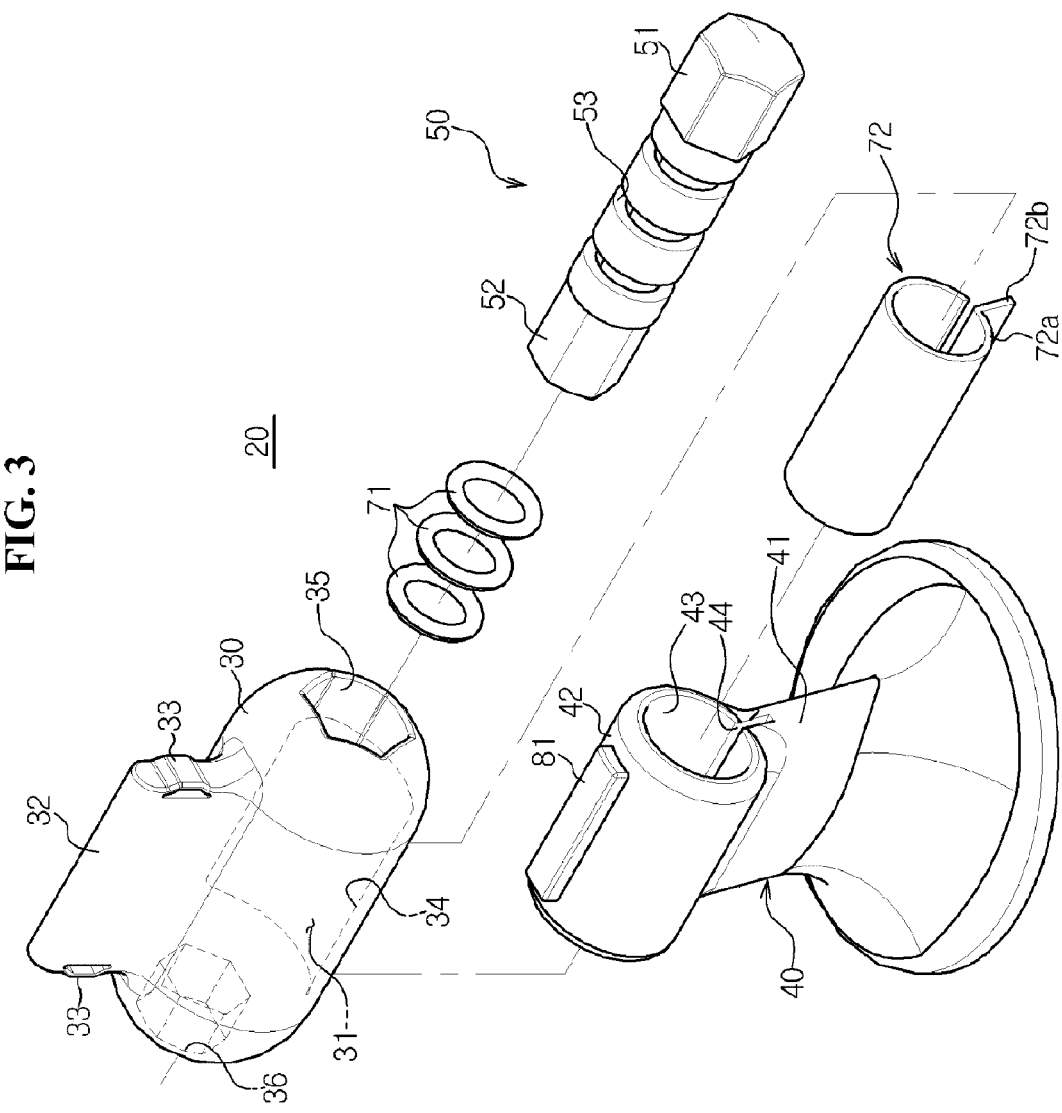
FIG. 3 is an exploded perspective view of the supporting device for the display apparatus according to the present invention.
Figure 4:
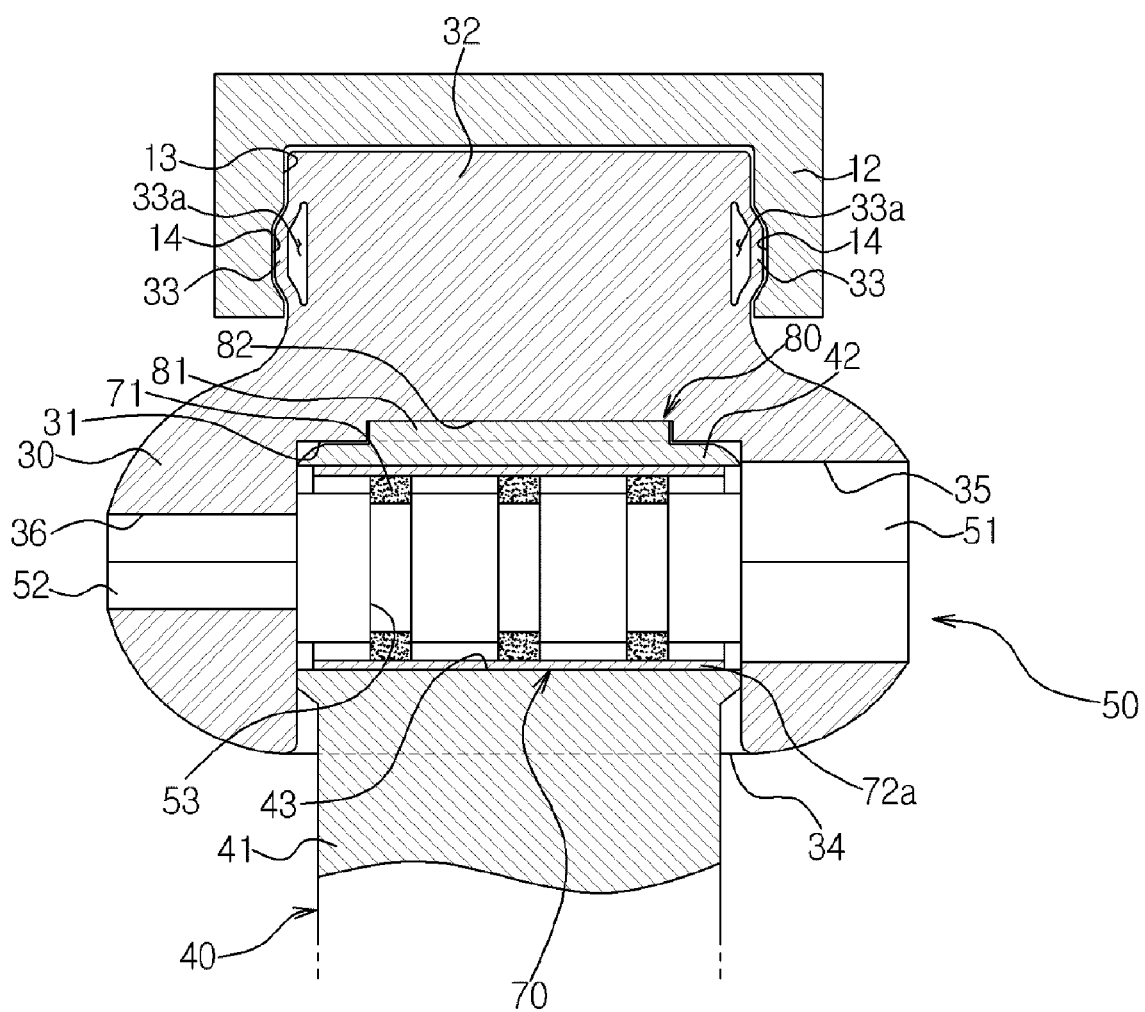
FIG. 4 is a sectional view taken along the line IV-IV' of FIG. 2.

As shown in FIGS. 2 to 4, the first supporting member 30 has an elongated cylindrical shape having a long longitudinal length. The first supporting member 30 internally defines a cylindrical bore 31 having an opened bottom for the coupling of the second supporting member 40. The first supporting member 30 has a body connecting portion 32 extending upward from an outer surface thereof to be connected with the body 10. For the insertion and coupling of the body connecting portion 32, the supporting bracket 12 attached to the rear surface of the body 10 defines therein a connecting chamber 13. The connecting chamber 13, as shown in FIG. 4, is formed, at opposite lateral surfaces thereof, with recesses 14, and the body connecting portion 32 is formed, at opposite lateral surfaces thereof, with elastically-deformable protrusions 33 to be inserted into and caught by the recesses 14. In FIG. 4, reference numeral 33a denotes a space for the deformation of each protrusion 33. With this configuration, as the body connecting portion 32 is inserted into the connecting chamber 13, both the protrusions 33 are elastically deformed so as to be inserted into and caught by the recesses 14.

The second supporting member 40 has a supporting portion 41 having a predetermined length, and a connecting portion 42 provided at an upper end of the supporting portion 41. The connecting portion 42 has a cylindrical outer surface to correspond to the bore 31 of the first supporting member 30. With this configuration, as the connecting portion 42 is inserted into the bore 31, the first supporting member 30 can be connected with the second supporting member 40 such that the first supporting member 30 is rotatable relative to the second supporting member 40. To couple the connecting portion 42 with the bore 31, as shown in FIG. 2, the connecting portion 42 is inserted into the bore 31 through an opening 34 perforated in the bottom of the bore 31. The opening 34 has a size sufficient to insert the connecting portion 42 into the bore 31, and preferably, has a size slightly smaller than that of the connecting portion 42. In this case, the opening 34 of the first supporting member 30 can be slightly deformed when the connecting portion 42 is press-fitted into the bore 31, thereby enabling the connection of the first and second supporting members 30 and 40. After being completely coupled, the connecting portion 42 is not easily separated from the bore 31. Although the embodiment shown in FIGS. 2 to 5 illustrates the connecting portion 42 having a rounded outer surface, the shape of the connecting portion 42 is not limited thereto. The outer surface of the connecting portion may have a polygonal or toothed shape.

The connecting shaft 50, as shown in FIG. 4, is penetrated through the first and second supporting members 30 and 40 in a longitudinal direction thereof after the connecting portion 42 of the second supporting member 40 is inserted into the bore 31 of the first supporting member 30. With the coupling of the connecting shaft 50, the first supporting member 30 and the second supporting member 40 can be rotated relative to each other about the connecting shaft 50. To achieve the coupling of the connecting shaft 50, the connecting portion 42 defines therein a shaft coupling bore 43 such that the connecting shaft 50 is penetrated through the shaft coupling bore 43. The connecting shaft 50 has a first polygonal head 51 and a second polygonal head 52 formed at both ends thereof, respectively. The first supporting member 30 has a first polygonal coupling hole 35 and a second polygonal coupling hole 36 formed at both lateral sides thereof, respectively, to correspond to the first polygonal head 51 and the second polygonal head 52 for the coupling of the first and second polygonal heads 51 and 52. Here, the first polygonal head 51 is larger than the second polygonal head 52. This is to allow the connecting shaft 50 to be inserted into the first coupling member 30 from only one direction of the first coupling member 30, for example, from the right side of FIG. 4. Once the first polygonal head 51 is coupled with the first polygonal coupling hole 35 and the second polygonal head 52 is coupled with the second polygonal coupling hole 36, the connecting shaft 50 can be limited in rotation relative to the first supporting member 30. Thereby, both the ends of the connecting shaft 50 are fixed to both the lateral sides of the first supporting member 30.

In the present embodiment, a friction structure 70 is installed between an outer surface of the connecting shaft 50 and an inner surface of the shaft coupling bore 43 to provide a rotation resistance. The friction structure 70, as shown in FIGS. 3 and 4, includes a plurality of friction rings 71 arranged around the outer surface of the connecting shaft 50 by an interval, and a friction spring 72 received in the shaft coupling bore 43 to tighten an outer surface of each friction ring 71. The plurality of friction rings 71 are made of elastically-deformable rubber, silicon, soft resin, etc. The connecting shaft 50 has a plurality of coupling grooves 53 for the coupling of the friction rings 71. As the friction rings 71 are coupled with the respective coupling grooves 53, it is possible to prevent the friction rings 71 from being pushed in a longitudinal direction of the connecting shaft 50, and to keep the friction rings 71 at their fixed positions.

The friction spring 72, as shown in FIG. 3, includes a cylindrical tightening portion 72a to tighten the outer surface of the respective friction rings 71, and a fixing portion 72b formed by bending one end of the tightening portion 72a to extend downward. The fixing portion 72b is fitted into an elongated fixing slot 44 perforated longitudinally in the bottom of the shaft coupling bore 43. After the fixing portion 72b is fitted into the slot 44, the friction spring 72 is limited in rotation relative to the second supporting member 40.

Once the screen angle of the body 10 is adjusted by rotating the first supporting member 30 relative to the second supporting member 40, the friction structure 70 prevents a further rotation of the first supporting member 30, thereby keeping the adjusted angle of the body 10. That is, the friction structure 70 provides a rotation resistance sufficient to keep the body 10 at the adjusted angle. In addition, the friction rings 71, as shown in FIG. 4, have the function of restraining the connecting shaft 50 as they are tightened by the friction spring 72. Accordingly, there is no risk of axial separation of the connecting shaft 50 so long as no external force is applied. Although the present embodiment illustrates the friction structure 70 including the friction rings 71 and the friction spring 72, the friction structure 70 may include any one of the friction rings 71 and the friction spring 72. That is, even if the friction structure 70 includes only the friction rings 71 or only the friction spring 72, the friction structure 70 can provide a rotation resistance.

Figure 5:
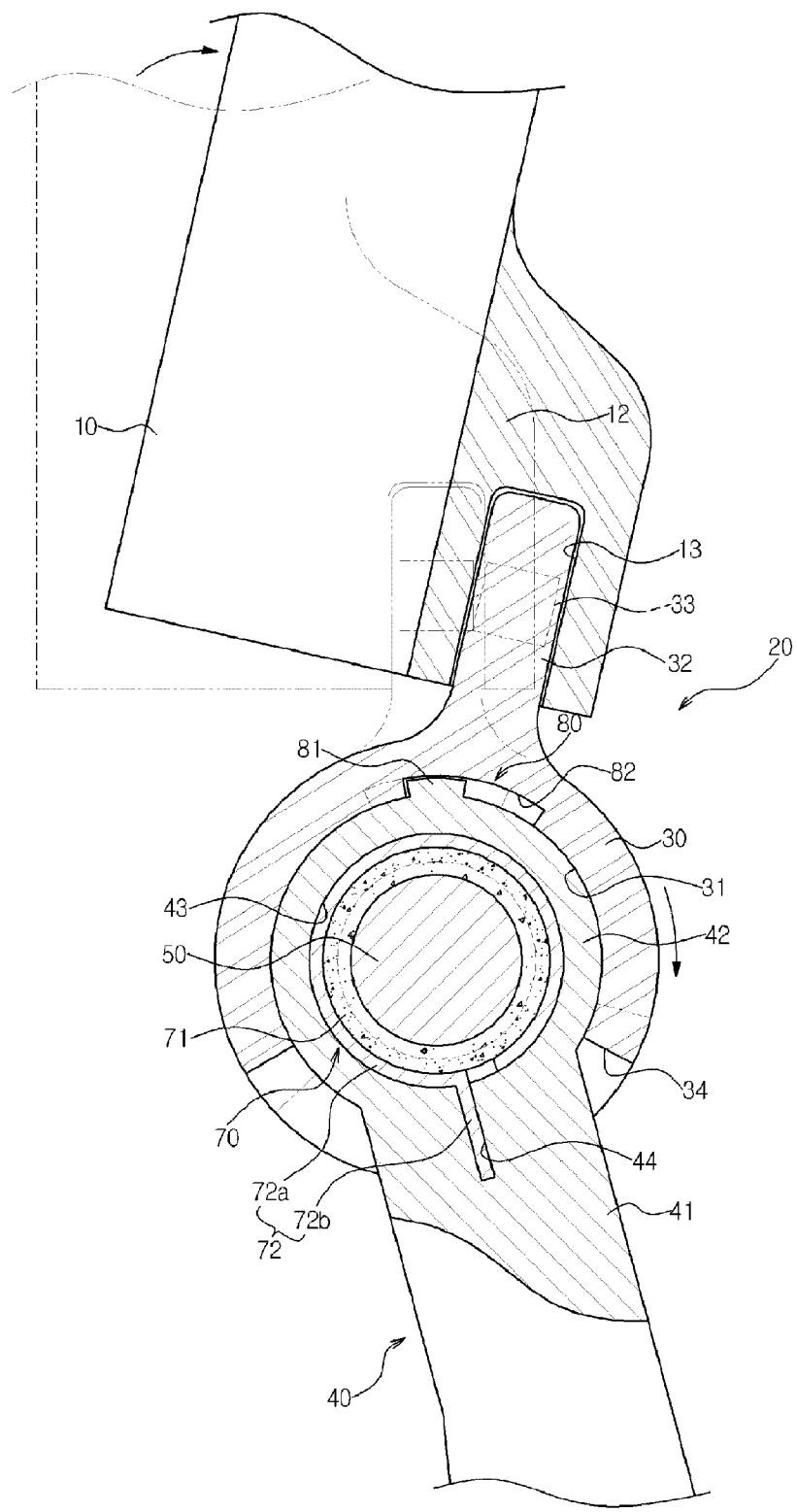
FIG. 5 is a sectional view of the supporting device for the display apparatus according to the present invention, illustrating the adjustment of an angle.

In addition to the friction structure 70, a rotation-limit structure 80 is provided at an inner surface of the bore 31 and an outer surface of the connecting portion 42, to allow the first supporting member 30 to be rotated relative to the second supporting member 40 only by a predetermined range. The rotation-limit structure 80, as shown in FIG. 2, includes a rotation-limit protrusion 81 protruding from the outer surface of the connecting portion 42, and a rotation-limit recess 82 formed in the inner surface of the bore 31. The rotation-limit protrusion 81 can be inserted into the rotation-limit recess 82 such that it is rotated only by a predetermined range. The rotation-limit recess 82 has a width larger than a width of the rotation-limit protrusion 81. With this configuration, as shown in FIG. 5, the first supporting member 30 can be rotated by a predetermined range to adjust the screen angle of the body 10, and the rotation-limit recess 82 can be caught by the rotation-limit protrusion 81 to limit an excessive rotation of the first supporting member 30.

In the above described supporting device 20 for the display apparatus, the first supporting member 30, the second supporting member 40, and the connecting shaft 50 may be fabricated by injection molding resins. Accordingly, the respective elements can be easily manufactured with low manufacturing costs. Further, the supporting device 20 has an ease in assembling as will be described hereinafter.

As shown in FIG. 3, to assemble the supporting device 20, first, the friction spring 72 is coupled into the second supporting member 40, and thereafter, the connecting portion 42 of the second supporting member 40 is inserted into the bore 31 of the first supporting member 30. Next, the plurality of friction rings 71 are coupled around the connecting shaft 50, and the connecting shaft 50 is inserted into the first supporting member 30 from one side of the first supporting member 30. In this way, the assembling of the supporting device 20 is completed.

As described above, the supporting device 20 of the present invention has a more simplified manufacture and assembling process than the prior art, and can achieve high productivity and low manufacturing costs. Further, with the configuration in that the connecting portion 42 of the second supporting member 40 is received in the bore 31 of the first supporting member 30, the first and second supporting members 30 and 40 can achieve a stable coupling while being capable of rotating relative to each other. Furthermore, since the connecting portion 42 is completely hidden after being completely received in the bore 31, the supporting device 20 can achieve a favorable outer appearance.

As apparent from the above description, the present invention provides a supporting device for a display apparatus, which has a more reduced number of constituent elements than the prior art, and can achieve an ease in manufacture and a simplified assembling process of the constituent elements as compared to the prior art. As a result, the supporting device can achieve high productivity and low manufacturing costs.

Further, by virtue of the configuration in that a connecting portion of a second supporting member is received in a bore of a first supporting member, a stable coupling of the first and second supporting members can be accomplished even while assuring a relative rotation between the first and second supporting members.

Furthermore, by allowing the connecting portion of the second supporting member to be received completely in the first supporting member so as not to be exposed to the outside, the supporting device can achieve a favorable outer appearance.

Although the embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A supporting device for a display apparatus comprising:
a first supporting member coupled to a body of the display apparatus and defining therein a bore having an opened bottom;
a second supporting member having a connecting portion to be inserted into the bore, an outer surface of the connecting portion being configured to correspond to an inner surface of the bore, wherein the connecting portion has a shaft coupling bore defined therein;
a base to support the second supporting member;
a connecting shaft to rotatably connect the first supporting member with the connecting portion and having both ends fixed to the first supporting member, wherein the connecting shaft is provided in the shaft coupling bore of the connecting portion; and
a friction structure provided between an outer surface of the connecting shaft and an inner surface of the shaft coupling bore of the connecting portion.

2. A supporting device for a display apparatus comprising:
a first supporting member coupled to a body of the display apparatus and defining therein a bore having an opened bottom;
a second supporting member having a connecting portion to be inserted into the bore, an outer surface of the connecting portion being configured to correspond to the bore;
a base to support the second supporting member;
a connecting shaft to rotatably connect the first supporting member with the connecting portion and having both ends fixed to the first supporting member; and a friction structure provided between an outer surface of the connecting shaft and the connecting portion, wherein:
the connecting shaft comprises first and second polygonal heads formed at both the ends thereof; and
the first supporting member comprises first and second polygonal coupling holes corresponding to the first and second polygonal heads to be coupled with the first and second polygonal heads, respectively.

3. The supporting device according to claim 2, wherein the first polygonal head is larger than the second polygonal head.

4. The supporting device according to claim 1, further comprising:
a rotation-limit structure provided at an inner surface of the bore and the outer surface of the connecting portion, to allow the first supporting member to be rotated relative to the second supporting member only by a predetermined range.

5. The supporting device according to claim 4, wherein the rotation-limit structure comprises a rotation-limit protrusion protruding from the outer surface of the connecting portion and a rotation-limit recess formed in the inner surface of the bore, the rotation-limit protrusion being inserted into and rotated in the rotation-limit recess by a predetermined range.

6. A supporting device for a display apparatus comprising:
a first supporting member coupled to a body of the display apparatus and defining therein a bore having an opened bottom;
a second supporting member having a connecting portion to be inserted into the bore, an outer surface of the connecting portion being configured to correspond to the bore;
a base to support the second supporting member;
a connecting shaft to rotatably connect the first supporting member with the connecting portion and having both ends fixed to the first supporting member; and
a friction structure provided between an outer surface of the connecting shaft and the connecting portion,
wherein the friction structure comprises at least one of a friction ring coupled around the outer surface of the connecting shaft and a friction spring fixed in the connecting portion.

7. The supporting device according to claim 6, wherein:
the connecting portion comprises a shaft coupling bore for the penetration of the connecting shaft; and
the friction spring comprises a cylindrical tightening portion disposed in the shaft coupling bore to tighten an outer surface of the friction ring and a fixing portion extending from one end of the tightening portion and fitted into a slot formed in the shaft coupling bore of the connecting portion.

8. The supporting device according to claim 6, wherein the connecting shaft comprises a coupling groove formed in the outer surface thereof for the coupling of the friction ring.

9. A supporting device for a display apparatus comprising:
a first supporting member coupled to a body of the display apparatus and defining therein a bore having an opened bottom;
a second supporting member having a connecting portion to be inserted into the bore, an outer surface of the connecting portion being configured to correspond to the bore;
a base to support the second supporting member;
a connecting shaft to rotatably connect the first supporting member with the connecting portion and having both ends fixed to the first supporting member; and
a friction structure provided between an outer surface of the connecting shaft and the connecting portion,
wherein the first supporting member comprises a body connecting portion extending from an outer surface thereof so as to be inserted into a connecting chamber of a supporting bracket attached to the body, and the body connecting portion comprises at least one elastic-deformable protrusion, and the connecting chamber comprises at least one recess so that the protrusion is inserted into and caught by the recess.

10. The supporting device according to claim 1, wherein the first supporting member, the second supporting member, and the connecting shaft are made of resins.

11. A display apparatus comprising a body having a screen and a supporting device to support the body, wherein
the supporting device comprises:
a first supporting member coupled to a body of the display apparatus and defining therein a bore having an opened bottom;
a second supporting member having a connecting portion to be inserted into the bore, an outer surface of the connecting portion being configured to correspond to an inner surface of the bore, wherein the connecting portion has a shaft coupling bore defined therein;
a base to support the second supporting member;
a connecting shaft to rotatably connect the first supporting member with the connecting portion and having both ends fixed to the first supporting member, wherein the connecting shaft is provided in the shaft coupling bore of the connecting portion; and
a friction structure provided between an outer surface of the connecting shaft and an inner surface of the shaft coupling bore of the connecting portion.

12. A display apparatus comprising a body having a screen and a supporting device to support the body, wherein
the supporting device comprises:
a first supporting member coupled to a body of the display apparatus and defining therein a bore having an opened bottom;
a second supporting member having a connecting portion to be inserted into the bore, an outer surface of the connecting portion being configured to correspond to the bore;
a base to support the second supporting member;
a connecting shaft to rotatably connect the first supporting member with the connecting portion and having both ends fixed to the first supporting member; and
a friction structure provided between an outer surface of the connecting shaft and the connecting portion,
wherein:
the connecting shaft comprises first and second polygonal heads formed at both the ends thereof; and
the first supporting member comprises first and second polygonal coupling holes corresponding to the first and second polygonal heads to be coupled with the first and second polygonal heads, respectively.

13. The display apparatus according to claim 12, wherein the first polygonal head is larger than the second polygonal head.

14. The display apparatus according to claim 11, further comprising:
a rotation-limit structure provided at an inner surface of the bore and the outer surface of the connecting portion, to allow the first supporting member to be rotated relative to the second supporting member only by a predetermined range.

15. The display apparatus according to claim 14, wherein the rotation-limit structure comprises a rotation-limit protrusion protruding from the outer surface of the connecting portion and a rotation-limit recess formed in the inner surface of the bore, the rotation-limit protrusion being inserted into and rotated in the rotation-limit recess by a predetermined range.

16. A display apparatus comprising a body having a screen and a supporting device to support the body, wherein
the supporting device comprises:
a first supporting member coupled to a body of the display apparatus and defining therein a bore having an opened bottom;
a second supporting member having a connecting portion to be inserted into the bore, an outer surface of the connecting portion being configured to correspond to the bore;
a base to support the second supporting member;
a connecting shaft to rotatably connect the first supporting member with the connecting portion and having both ends fixed to the first supporting member; and
a friction structure provided between an outer surface of the connecting shaft and the connecting portion,
wherein the friction structure comprises at least one of a friction ring coupled around the outer surface of the connecting shaft and a friction spring fixed in the connecting portion.

17. The display apparatus according to claim 16, wherein:
the connecting portion comprises a shaft coupling bore for the penetration of the connecting shaft; and
the friction spring comprises a cylindrical tightening portion disposed in the shaft coupling bore to tighten an outer surface of the friction ring and a fixing portion extending from one end of the tightening portion and fitted into a slot formed in the shaft coupling bore of the connecting portion.

18. The display apparatus according to claim 16, wherein the connecting shaft comprises a coupling groove formed in the outer surface thereof for the coupling of the friction ring.

19. A display apparatus comprising a body having a screen and a supporting device to support the body, wherein
the supporting device comprises:
a first supporting member coupled to a body of the display apparatus and defining therein a bore having an opened bottom;
a second supporting member having a connecting portion to be inserted into the bore, an outer surface of the connecting portion being configured to correspond to the bore;
a base to support the second supporting member;
a connecting shaft to rotatably connect the first supporting member with the connecting portion and having both ends fixed to the first supporting member; and
a friction structure provided between an outer surface of the connecting shaft and the connecting portion,
wherein the first supporting member comprises a body connecting portion extending from an outer surface thereof so as to be inserted into a connecting chamber of a supporting bracket attached to the body, and the body connecting portion comprises at least one elastic-deformable protrusion, and the connecting chamber comprises at least one recess so that the protraction is inserted into and caught by the recess.

20. The display apparatus according to claim 11, wherein the first supporting member, the second supporting member, and the connecting shaft are made of resins.

* * * * *